Patented Apr. 7, 1931

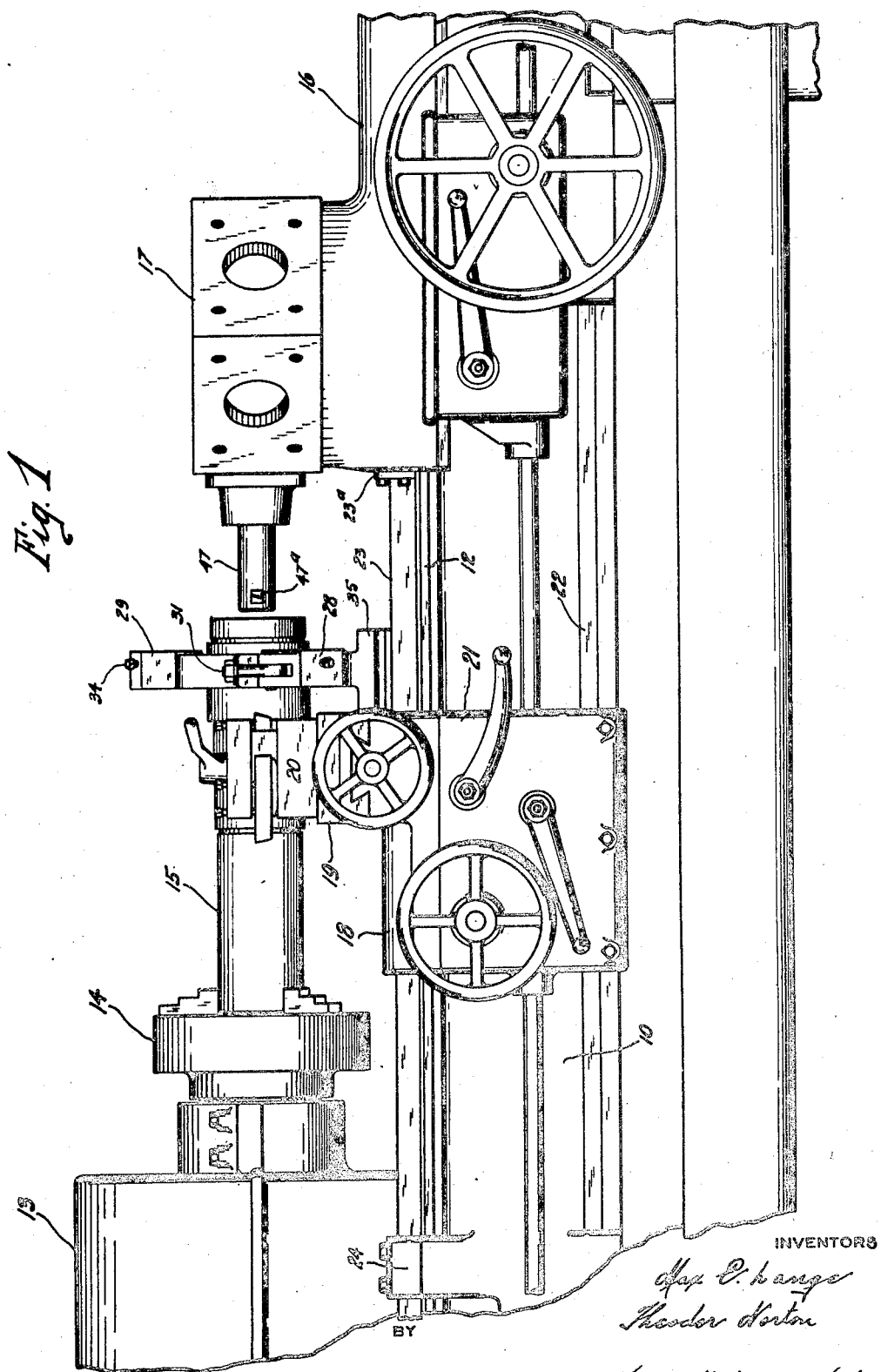

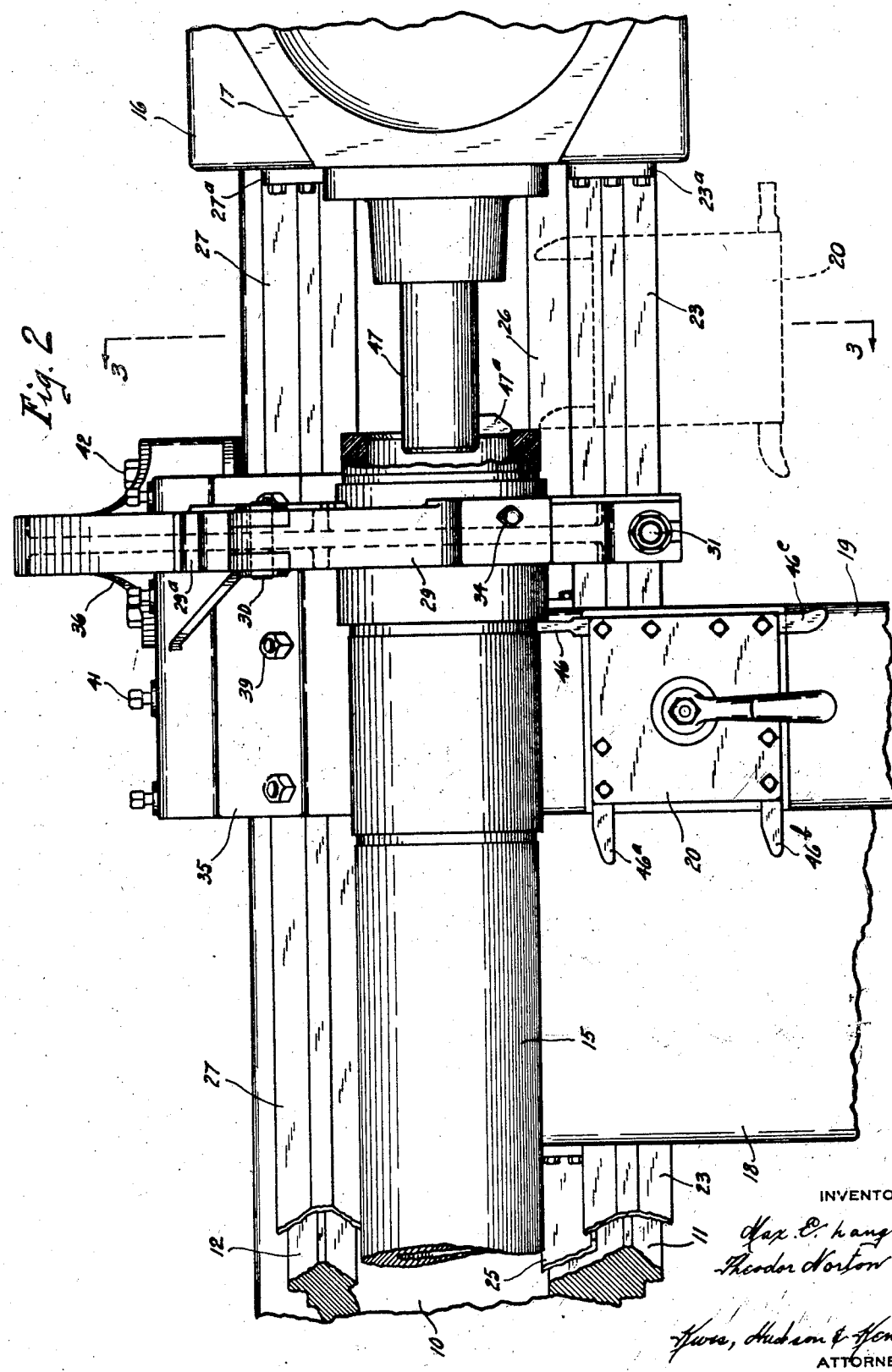

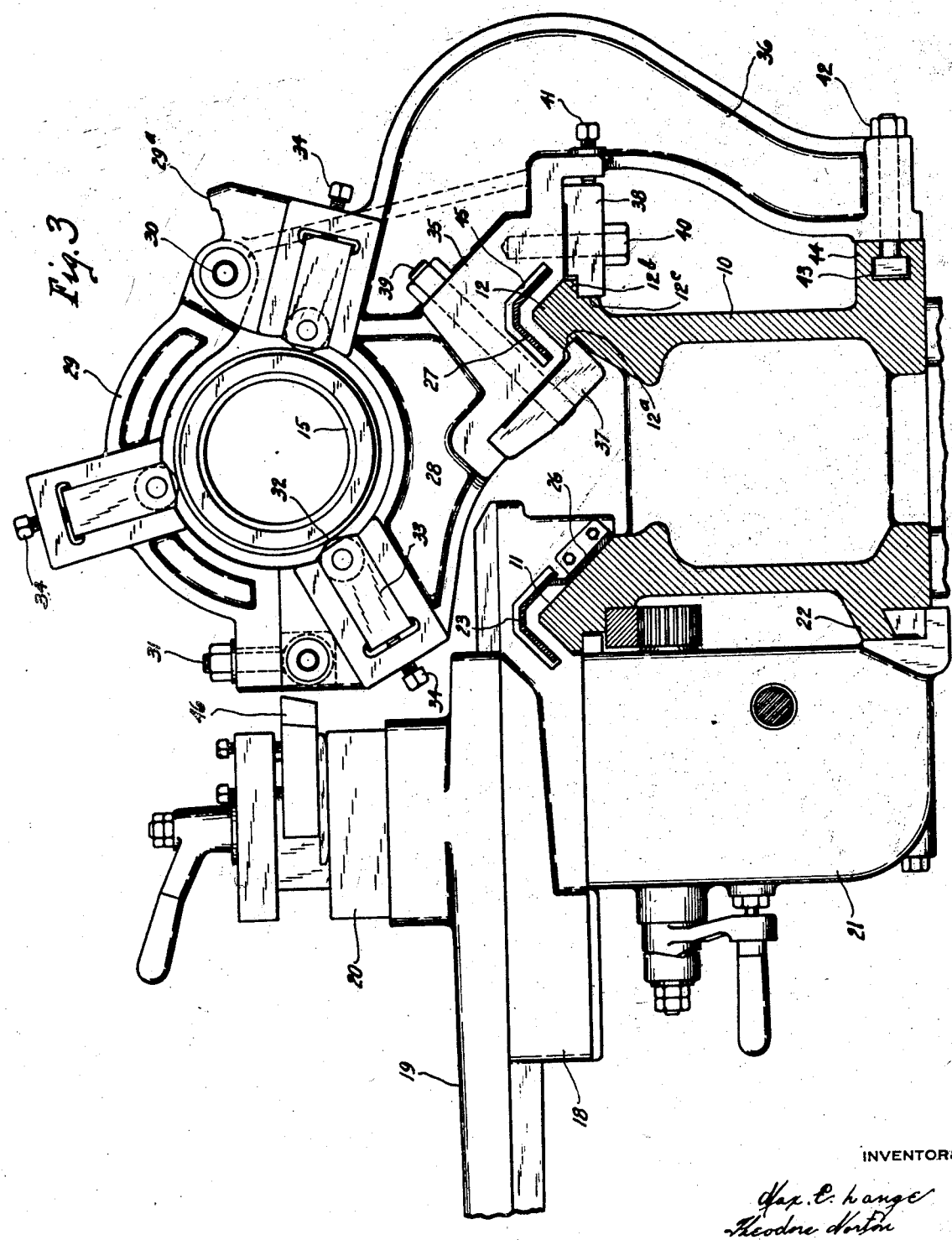

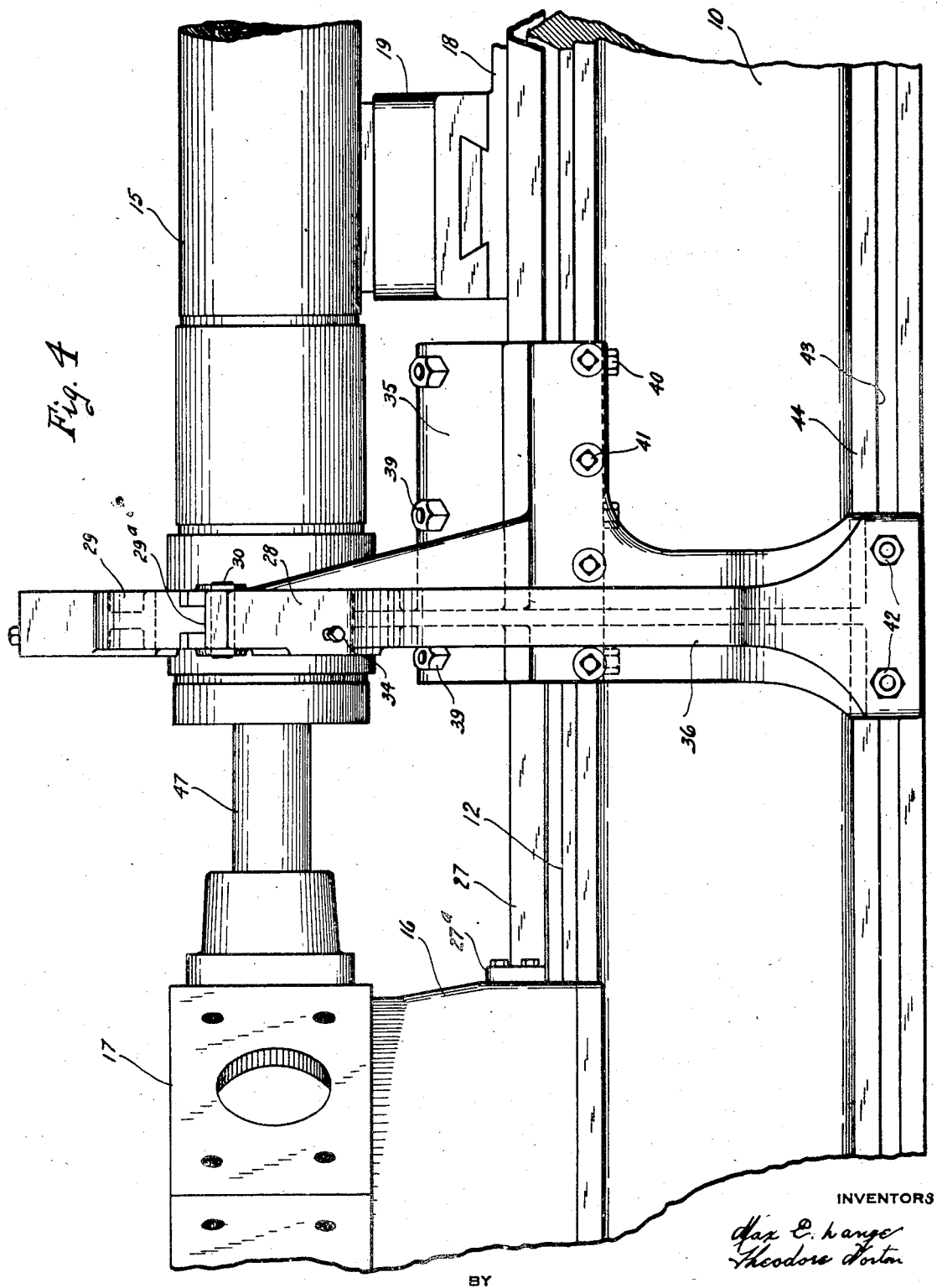

1,799,518

UNITED STATES PATENT OFFICE

MAX E. LANGE AND THEODORE NORTON, OF CLEVELAND HEIGHTS, OHIO, ASSIGNORS TO THE WARNER & SWASEY COMPANY, OF CLEVELAND, OHIO, A CORPORATION OF OHIO

MACHINE TOOL

Application filed July 7, 1928. Serial No. 291,034.

This invention relates to machine tools and particularly to machine tools which are provided with a steady-rest to support the forward end of a work piece and to hold it in proper relation with the axis of the machine when work pieces of considerable length are being machined.

One of the objects of the invention is to increase the utility of a machine of this kind by providing a steady-rest and supporting it in a manner such that it will not interfere with the movements of the cross-slide carriage which in accordance with my invention may be moved freely past the steady-rest so that the tool or tools carried by the cross-slide may machine the work piece on either or both sides of the steady-rest.

A further object is to admit of the use of way-guards on a machine tool having a steady-rest such as referred to above without any interference between the guard or guard members and the steady-rest.

Another object is to provide a guard for the way which is engaged by the steady-rest without interference between these parts and with the parts so arranged that the steady-rest has a supporting function for the guard.

A further object is to provide novel and effective means for supporting the steady-rest on the bed and for clamping it thereto, said steady-rest in the preferred form of the invention being slidingly supported on the rear way and on the rear side of the bed beneath the way so that it may be moved along the bed and clamped to said way and to the bed in a novel and effective manner.

The above and other objects are attained by our invention which may be here briefly summarized as consisting in certain novel combinations and arrangements of parts and details of construction which will be described in the specification and set forth in appended claims.

Referring now to the drawings, Fig. 1 is a side elevation of a machine tool here shown in the form of a turret lathe, the same being constructed in accordance with our invention, a portion of the head end and a portion of the rear end of the machine being omitted; Fig. 2 is a top plan view, omitting the head and a portion of the turret, parts being in section, and the parts being shown on an enlarged scale; Fig. 3 is a transverse sectional view substantially along the line 3—3 of Fig. 2; and Fig. 4 is a rear view, this view showing particularly the mounting of the steady-rest on the rear way and on the rear side of the bed.

Referring to the drawings, 10 represents the bed of the machine tool, the same being provided with front and rear ways 11 and 12. At the front end of the bed is the usual head 13 which may be of customary construction, the spindle in this instance being provided with a chuck 14 which supports the rear end of the work piece and rotates the latter, the work piece being here shown as a long cylindrical member 15.

Slidably supported on both ways of the bed is a turret slide 16 which also may be of usual construction, the slide having a tool supporting turret 17.

The machine tool herein illustrated is provided also with a cross-slide carriage 18 having a cross-slide 19 which supports in this instance a tool holder in the form of a square turret 20. The cross-slide carriage 18 engages the front way 11 and it has an apron 21 the lower portion of which is formed to engage a lower way 22 provided on the front side of the bed 10. The usual power and hand operated means will be provided for moving the turret slide and cross-slide carriage along the bed and for moving the cross-slide on the cross-slide carriage.

Guards are provided for both the front and rear ways 11 and 12 of the bed, the guard for the front way 11 including an upper guard member 23 which is secured at 23a to the turret slide 16 and extends over the way 11 through an opening in the cross-slide carriage 18, being supported by this carriage as clearly illustrated in Fig. 3. This guard member not only is in supporting relation with the cross-slide carriage 18 but preferably also slides through and is in supporting relation with a front support 24 provided on the bed at the forward end of the way. Additionally, the guard for the way 11 includes lower guard members 25 and 26 which are secured to opposite sides of the cross-slide carriage 18 and are in sliding engagement with the upper guard member 23 on the inner side of way 11, as is best illustrated in Fig. 3. The lower guard member 25 preferably extends through an opening in the turret slide 16 and is supported therein in a manner more fully described in U. S. Patent No. 1,575,735, granted March 9, 1926, in the names of Edward P. Burrell and John J. N. Van Hamersveld.

The rear way 12 is guarded by a single guard member 27 which is preferably secured at 27a to the front side of the turret slide 16 and projects over the rear way and at its forward end extends through and has sliding engagement with a support similar to the front support 24 for the guard 23 of the front way 11. While in this instance we show movable guard members for the ways of the bed, we do not wish to be limited to movable guards for in some instances stationary guards or guard members may be employed. As will appear presently, there is a cooperative relationship between the steady-rest and guard for the rear way and as far as the invention in its broader aspects is concerned, it is immaterial whether the rear guard is movable or stationary.

In adapting the machine tool for work pieces of considerable length, such as illustrated herein, it is often desirable that the front end of the work piece be supported by a steady-rest so that it will be firmly supported centrally with respect to the axis of the machine, and be capable of effectively resisting the thrust due to the cutting of the tool. We provide a steady-rest which enables the attainment of the objects stated at the beginning of the specification, the steady-rest being specially constructed and supported so as not to interfere with the free movements of the cross-slide carriage forwardly or rearwardly of the steady-rest and so as not to interfere with the guard for the rear way but, in fact, to increase the utility of the guard by serving as a support for it. The construction and the manner of supporting this steady-rest will now be explained.

It will be observed that this steady-rest completely encircles the work piece, as is desirable, and that it is composed of a lower main body portion 28 and an upper pivoted portion 29 which surround the work piece. The pivoted portion 29 is pivoted to the body portion 28 at 30 on the rear side of the machine and at the front side is adapted to be secured in clamping engagement with the front part of the body portion 28 by a pivoted clamping bolt 31, the latter being pivoted to the body portion and adapted to engage the slotted front part of the pivoted portion 29. The portion 29 may be swung upward to allow the work piece to be removed from or placed into the machine.

While in its upward position an abutment 29a serves to hold the portion 29 in such position. The portions 28 and 29 are provided with work engaging rollers 32 which are adapted to take the radial thrust of the work, these rollers being supported by radially disposed slides 33 spaced substantially equal distances apart and adapted to be adjusted and moved inward by radially disposed set-screws 34.

It will be observed that the steady-rest overhangs the front way 11 but there is a sufficient clearance between this overhanging portion and the front way 11 to permit the free movement of the cross-slide carriage 18 with its cross-slide 19 beneath and past the steady-rest for purposes to be explained presently. Furthermore, the body portion 28 of the steady-rest is provided with a seating portion 35 which engages the rear way 12 and it is provided also with a rearwardly and downwardly extending supporting arm 36 which engages the rear side of the bed, as will be explained. The seating portion 35 carries two clamps 37 and 38. The front clamp 37 is adapted to be secured by a series of diagonally disposed clamping bolts 39 against a diagonally disposed shoulder 12a at the lower front part of the way 12. The clamp 38 is adapted to be secured by a series of vertically disposed screws 40 against a horizontal shoulder 12b at the lower rear part of the way 12. Additionally, the clamp 38 is engaged by a series of horizontally disposed set-screws 41 carried by the rear part of the steady-rest body, these screws serving to secure the clamp 38 against a vertical shoulder 12c also at the lower rear side of the way 12. The function of the clamps 37 and 38, with the bolts 39, screws 40 and set-screws 41 is to draw the steady-rest vertically down onto both inclined surfaces of the V-shaped way 12 and also to cause tight clamping engagement with the shoulders 12a, 12b and 12c formed along the bottom of the way 12.

The lower end of the arm 36 is widened out somewhat and is provided with horizontally disposed clamping bolts 42 with heads engaging in a T-slot 43 formed in a horizontally disposed rib 44 provided along the rear side of the bed 10 a suitable distance below the rear way 12.

Thus this steady-rest is supported solely on the way 12 and on the rear side of the bed, and it can be securely clamped to the rear way 12 and to the rear side of the bed. When the clamping screws and bolts are loosened, it is obvious that the steady-rest can be moved along the bed and then clamped thereto in any desired position.

It will be observed that the seating portion 35 of the steady-rest is provided with an opening 45 to accommodate the guard 27 for the rear way 12 and that the guard projects through and engages the base of this opening 45 so that the steady-rest will serve as a support for the guard which is in sliding relation with the steady-rest when the guard is moved with the turret slide 16. In brief, with this construction the steady-rest is clamped upon the rear way but does not interfere with the guard for the rear way nor does the guard interfere with the seating of the steady-rest on the rear way. On the other hand, there is a degree of cooperation between these parts inasmuch as they are in sliding supporting relation.

It was already mentioned that, by reason of the fact that the steady-rest is supported on the rear way and rear side of the bed and because sufficient clearance has been provided between the front overhanging portion of the steady-rest and front way 11, the cross-slide carriage may be moved freely past the steady-rest. This has the important function of admitting of the machining of the work piece both forwardly and rearwardly of the steady-rest by tools carried by the cross-slide carriage. In this instance, as will be observed from Fig. 2, the square turret 19 of the steady-rest is provided with four tools 46, 46a, 46b and 46c. One or more of these tools may be utilized for turning or facing purposes on portions of the work piece both forwardly and rearwardly of the steady-rest by indexing the square turret 19 so as to position properly a selected one of the tools. In Fig. 2, the cross-slide carriage is shown forwardly of the steady-rest and one of the tools is shown positioned for grooving a portion of the work piece forwardly of the steady-rest. By dotted lines we show the turret rearwardly of the steady-rest as the square turret would be positioned by moving the cross-slide carriage past the steady-rest to the rear of it and one of the tools is shown by dotted lines in position for turning the front cylindrical part of the work piece. In the same position of the carriage, a facing cut could be taken on the extreme front end of the work piece or other tools may be positioned for recessing or grooving, in accordance with the requirements of any particular work piece.

The turret 17 may be equipped with any number of tools which will function in the usual manner, one face of the turret in this instance being provided with a tool holder 47 having a tool 47a for boring an opening in the work piece.

Thus it will be seen that by the construction herein described there is lack of interference and on the other hand freedom of motion, giving the machine tool a wide range of use and adapting it for machining functions not permissible with the ordinary constructions wherein a steady-rest is provided.

While we have shown the preferred construction, we do not desire to be confined to the precise details or arrangements shown but aim in our claims to cover all modifications which do not involve a departure from the spirit and scope of our invention.

Having thus described our invention, we claim:—

1. A machine tool having a bed provided with a pair of ways, a work holder for rotating the work piece, a steady-rest on one of said ways for supporting the front part of the work piece, a cross-slide carriage movable on the other of said ways past the steady-rest, and a second carriage movable on both of said ways.

2. A machine tool having a bed with a front way and a rear way, a work holder for rotating the work piece, a cross-slide carriage movable on the front way of the bed, a steady-rest supported on the rear way of the bed so as not to interfere with the movements of the cross-slide carriage, and a second carriage movable on both ways.

3. A machine tool having a bed with a front way and a rear way, a head having means for supporting the rear end of a work piece and for rotating it, a cross-slide carriage movable along the front way of the bed, a steady-rest for the front part of the work piece, means for clamping the steady-rest to the bed including the rear way, and a second carriage movable on both ways.

4. A machine tool having a bed with a front way and a rear way, a work holder having means for supporting the rear end of a work piece and for rotating it, a steady-rest adapted to engage and support the front part of the work piece and having supporting portions engaging the rear way and the bed beneath the rear way, and a carriage movable along both ways.

5. In combination with a machine tool having a bed with a front way and a rear way, means for supporting the rear end of the work piece and for rotating it, a steady-rest for supporting the front part of the work piece, said steady-rest having means by which it may be clamped to the rear way and having a supporting extension engaging another part of the bed so as to leave the front way clear, and a carriage movable along the rear way.

6. In combination with a machine tool having a bed with front and rear ways, means for supporting the rear end of the work piece and for rotating it, a steady-rest for supporting the front part of the work piece, said steady-rest having means by which it may be clamped to the rear way and having an arm extending downwardly alongside the rear side of the bed and adapted to be secured to the latter, and a carriage movable along the rear way.

7. A machine tool having a bed with a front way and a rear way, a steady-rest supported by the bed and adapted to support the front part of a work piece, said steady-rest being supported solely by the rear way and by the rear part of the bed, a carriage movable along the front way, and a second carriage movable along both ways.

8. A machine tool having a bed with front and rear ways, a steady-rest supported by the bed and adapted to support the front part of a work piece, said steady-rest adapted to be secured to and having sliding engagement with the rear way and with the rear side of the bed beneath the rear way, a carriage movable along the front way, and a second carriage movable along the rear way.

9. A machine tool having a bed with a way, a steady-rest engaging said way, and a guard for said way extending through the steady-rest.

10. A machine tool having a bed with a way, a steady-rest engaging the way, and a guard for said way having supporting engagement with the steady-rest.

11. A machine tool having a bed with a way, a steady-rest for a work piece engaging said way, and a guard for said way extending through and having supporting engagement with the steady-rest.

12. A machine tool comprising a bed with a way, a slide movable along the way and having a way-guard attached thereto and extending over the way, and a steady-rest for a work piece supported by the bed and engaging the way.

13. A machine tool having a bed with a way, a head having means for supporting the rear end of a work piece and for rotating it, a slide movable along the way and having a way-guard secured thereto, and a steady-rest for the front part of the work piece engaging said way, the guard projecting through the steady-rest.

14. A machine tool having a bed with a way, a head having means for supporting the rear end of a work piece and for rotating it, a slide movable along the way and having a way-guard secured thereto, and a steady-rest for supporting the front part of the work piece, said steady-rest being supported by the bed and engaging said way, the guard projecting through and having supporting engagement with the steady-rest.

15. In a machine tool, a bed having a way, a steady-rest for the work piece supported by the bed and engaging the way, the way having inclined active surfaces and shoulders beneath the same on opposite sides thereof, and means for securing the steady-rest to said surfaces and shoulders.

16. In a machine tool having a bed with a way, a steady-rest for the work piece having a seating portion engaging the way and having shoulders disposed at the bottom of the way and on opposite sides thereof and angularly disposed with reference to one another, and clamps for drawing the seating portion against the way and for causing clamping engagement with all said shoulders.

17. In a machine tool having a bed with a way, a steady-rest supported by the bed and engaging the way, the way having shoulders formed at the bottom and on opposite sides thereof, the shoulders being angularly disposed with reference to each other, and means for securing the steady-rest to the surfaces of the way and to said shoulders.

In testimony whereof, we hereunto affix our signatures.

MAX E. LANGE.
THEODORE NORTON.